US005991416A

United States Patent [19]

Bae

[11] Patent Number: 5,991,416

[45] Date of Patent: Nov. 23, 1999

[54] SCRAMBLING AND DESCRAMBLING CIRCUIT FOR A CORDLESS TELEPHONE

[75] Inventor: YI-Sung Bae, Seoul, Rep. of Korea

[73] Assignee: Samsung Electronics, Co. Ltd., Suwon, Rep. of Korea

[21] Appl. No.: 08/733,956

[22] Filed: Oct. 21, 1996

[30] Foreign Application Priority Data

Oct. 19, 1995 [KR] Rep. of Korea .................. 95-36270

[51] Int. Cl.[6] .................. H04K 1/04; H04B 1/10; H04Q 7/24; H04Q 7/32

[52] U.S. Cl. .................. 380/39; 380/40; 455/306; 455/465; 455/565

[58] Field of Search .................. 380/9, 19, 38, 380/39, 40; 455/306, 565, 465

[56] References Cited

U.S. PATENT DOCUMENTS

| | | | |
|---|---|---|---|
| 3,886,313 | 5/1975 | Branscome et al. | 179/1.5 S |
| 3,909,534 | 9/1975 | Majeau et al. | 179/1.5 R |
| 4,081,831 | 3/1978 | Tang et al. | 358/114 |
| 4,160,875 | 7/1979 | Kahn | 179/1.5 M |
| 4,195,202 | 3/1980 | McCalmont | 179/1.5 S |
| 4,278,840 | 7/1981 | Morgan et al. | 179/1.5 S |
| 4,773,092 | 9/1988 | Huang | 380/9 |
| 5,003,598 | 3/1991 | Kunstadt | 380/48 |
| 5,058,159 | 10/1991 | Quan | 380/19 |
| 5,065,430 | 11/1991 | Torii et al. | 380/38 |
| 5,278,907 | 1/1994 | Snyder et al. | 380/48 |
| 5,471,531 | 11/1995 | Quan | 380/19 |
| 5,528,692 | 6/1996 | Hester et al. | 380/38 |

*Primary Examiner*—Gail O. Hayes
*Assistant Examiner*—Hrayr A. Sayadian
*Attorney, Agent, or Firm*—Marger Johnson & McCollom, P.C.

[57] ABSTRACT

A scrambling and a descrambling circuit for cordless telephone provides a higher security level than current phone scrambling circuitry. The higher security level is accomplished by separating an audio signal into low and high frequency bands. The frequency bands are selectively inverted or non-inverted during scrambling and descrambling according to common selection conditions. The processed signals are mixed into an overall mixed signal. The overall mixed signal is selectively inverted or non-inverted during scrambling and descrambling according to a common selection condition to increase the phone's transmission security level.

13 Claims, 8 Drawing Sheets

SCRAMBLING AND DESCRAMBLING CIRCUIT FOR A CORDLESS TELEPHONE

BACKGROUND OF THE INVENTION (1) Field of the Invention

The present invention relates to cordless telephone systems and, more particularly, to a scrambling and a descrambling circuit for a cordless telephone.

(2) Description of the Related Art

Cordless telephones are widely used because of the convenience. In many cordless telephone systems, the transmission signals between the cordless telephone handset and the base station that carry private conversations can be casually received and eavesdropped.

Scrambling technology is used to prevent eavesdropping of the private phone conversations developed in voice and non-voice communication systems.

Scrambling techniques used in voice communication systems are classified under four categories. These four scrambling categories are frequency domain scrambling, time domain scrambling, amplitude scrambling and two-dimensional scrambling. Details of these four scrambling skills are disclosed in the paper entitled "A Comparison of four Methods for Analog Speech Privacy"(IEEE Transactions on Communications. Vol. COM-29, NO. 1, January 1981.) by Jayant et al.

Among the four scrambling categories, frequency domain scrambling is classified as using the methods of frequency inversion, band-shift inversion and spread spectrum. The spread spectrum method changes the band width of a scrambled signal. The frequency inversion and band-shift inversion methods do not change the band width of a scrambled signal.

In cordless telephone systems, the band width of an audio signal is generally restricted to a frequency of 300 Hz to 3400 Hz. Because the spread spectrum method changes the band width of the scrambled signal, it cannot be used for scrambling the restricted frequency band in cordless telephone systems.

Referring to the attached drawings, prior scrambling skills according to the frequency inversion and band-shift inversion methods will be described below.

The circuit in FIG. 4 is a frequency inversion scrambling circuit implemented in a transmitter such as located in a cordless telephone base unit. The circuit in FIG. 4 can also be used in descrambling circuits of a receiver such as located in a cordless telephone hand set. The frequency inversion scrambling circuit includes a first low pass filter 41 for receiving an audio input signal IN, a modulator 43 for receiving a predetermined split frequency Fs and the output signal of the first low pass filter 41. A second low pass filter 42 receives the output signal of the modulator 43 and generates an output signal OUT.

The first low pass filter 41 passes through the input signal IN for a frequency band lower than a given cutoff frequency. The modulator 43 outputs two frequency components, which are inverted and non-inverted signals of the output signal from the low pass filter 41. The modulator 43 transposes an inverted frequency component and a non-inverted frequency component symmetrically on the left and right side of the split frequency, respectively. The second low pass filter 42 passes through the output signal, from the modulator 43, having a frequency band lower than a given cutoff frequency, and provides the filtered signal that serves as an output signal OUT.

FIGS. 5A–5C and FIGS. 6A–6C illustrate the scrambling and descrambling waveforms respectively in the case that the cutoff frequency of the first and second low pass filter 41 and 42 is 3.4 KHz and the split frequency Fs of the modulator 43 is 3.7 KHz.

FIG. 5A shows a filtered output signal, from the first low pass filter 41 for an audio signal having a frequency band lower than 3.4 KHz. FIG. 5B shows the output signal of the modulator 43. The filtered output signal from the low pass filter 41 is inverted and the inverted signal is symmetrical on the left and right side of the split frequency Fs at 3.7 KHz. FIG. 5C shows the output signal OUT of the second low pass filter 42. The output signal OUT has a frequency band lower than the 3.4 KHz and is obtained low pass filter 42 of filtering the output signal of the modulator 43.

From the comparison of FIGS. 5A and 5C, the scrambling circuit inverts the low and high frequency components of the input signal IN, such that the low and high frequency components of the input signal IN are transformed into the high and low frequency components, respectively, of the output signal OUT.

The scrambled audio signal, from the scrambling circuit, is transmitted to a receiver by a communication channel. The transmitted signal is descrambled by the descrambling circuit in the receiver to obtain the original audio signal.

FIGS. 6A–6C show the descrambling procedure, when the circuit in FIG. 4 is used as a descrambling circuit in the receiver. The scrambling and descrambling circuitry are essentially the same in configuration. For convenience of description, we also consider the circuit in FIG. 4 as a descrambling circuit.

FIG. 6A shows the output signal of a first low pass filter 41. The first low pass filter 41 accepts a transmitted audio signal and passes through the transmitted audio signal having a frequency band lower than a given cutoff frequency. FIG. 6B shows the output signal of the modulator 43. The modulator 43 outputs two frequency components, which are an inverted and non-inverted signals of the output signal from the low pass filter 41. The modulator 43 transposes an inverted frequency component and a non-inverted frequency component symmetrically on the left and right side of the split frequency, respectively.

FIG. 6C shows the output signal of the second low pass filter 42. The second low pass filter 42 accepts the output signal of the modulator 43 and passes through the signal having a frequency band lower than a given cutoff frequency. The second low pass signal provides the filtered signal that serves as an output signal OUT. The cutoff frequencies of the two low pass filters and the split frequency of the modulator in the receiver are the same as those in the transmitter. As shown in FIGS. 5A and 6C, the input signal IN of the scrambling circuit in the transmitter is the same as the output signal OUT of the second low pass filter in the receiver.

FIG. 7A is a waveform showing the input signal of the modulator 43, and FIG. 7B is a waveform showing the output signal of the modulator 43.

The scrambling and descrambling circuits shown in FIG. 4 are widely used since the configuration is very simple. However, the scrambled signal output by the circuit described above is easily descrambled with a simple RF (radio frequency) receiver. Thus, eavesdropping of conversations from the cordless telephone can be easily conducted by tuning into the split frequency of the telephone modulator. Moreover, even when the exact split frequency is unknown, eavesdropping can still be performed as long as the RF receiver is tuned within the vicinity of the split frequency. For example, when the split frequency is 3.7 KHz, setting the modulator of the RF receiver to a split frequency of 3.5 KHz, still allows eavesdropping of the conversation.

FIGS. 8A and 8B show a scrambling procedure according to the band-shift inversion method. FIG. 8A is a graph showing power density of an audio signal as a function of frequency before scrambling. FIG. 8B is a graph showing power density of the audio signal as a function of frequency after scrambling. As shown in FIGS. 8A and 8B, an audio signal is separated into two parts, a low frequency band and a high frequency band, by a band split frequency Fs. The form of FIG. 8B is an inverted form of FIG. 8A.

The scrambling circuit according to the prior band-shift inversion method can obtain a relatively high security level. However, the configuration of the scrambling circuit is quite complicated. However, the scrambling circuit according to the band-shift inversion method also still allows room for a conversation to be eavesdropped by someone, because it is easy to determine the band split frequency Fs.

SUMMARY OF THE INVENTION

It is an object of the present invention to provide scrambling and descrambling circuits having a very high security level. The scrambling circuit according to the invention separates an audio input signal into low and high frequency bands, and inverts or non-inverts each of the bands with a predetermined selection mechanism. After the inversion or non-inversion process, the two band signals are mixed into a scrambled signal and transmitted to a receiver.

In the receiver, a descrambler circuit according to the present invention separates the scrambled signal into low and high frequency bands. The two frequency bands are inverted or non-inverted by the same selection mechanism as the scrambling circuit. If the two band signals are mixed, the original audio signal can be obtained.

Inverting or non-inverting each of the two band signals depends on a system designer's preference. Anyone who intends to eavesdrop on the conversation can not easily determine which frequency band is inverted or non-inverted. For this reason, the present invention assures a very high security level. For a higher security level, the scrambling circuit inverts or non-inverts the scrambled signal before transmitting. In this case, the descrambling circuit also should invert or non-invert the scrambled signal before the band separation of the scrambled signal.

The scrambling circuit according to present invention includes a low pass filtering means for passing through an audio input signal having a frequency band lower than a predetermined frequency. A first low pass filter separates a frequency band lower than a first cutoff frequency from the output signal of the low pass filtering means. A first inversion selecting circuit inverts or non-inverts the output signal of the low pass filter in response to a first predetermined selection signal. A high pass filter separates a frequency band higher than the first cutoff frequency from the output signal of said low pass filtering means. A second inversion selecting means inverts or non-inverts the output signal of the high pass filter in response to a second predetermined selection signal. An adder mixes the output signals of the first and second inversion selecting means. The mixed signal serves as a scrambled audio signal.

The scrambling circuit further includes a third inversion selecting circuit connected to the output terminal of the adder. The third circuit inverts or non-inverts the scrambled audio signal in response to a third predetermined selection signal.

According to the above described scrambling circuit, the audio input signal is separated into low and high frequency bands by the first low pass filter and high pass filter. Each of the two bands is inverted or non-inverted in response to the predetermined selection signal by corresponding inversion selecting means.

The adder mixes the two band signals providing the combined signal as a scrambled audio signal. The scrambled audio signal can be inverted or non-inverted by an additional third inversion selecting means before being transmitted. The scrambled audio signal is transmitted to a receiver by way of a communication channel such as an RF link.

Since it is difficult to determine which of the two bands is inverted or not inverted, the scrambling circuit of the present invention provides higher security than the prior scrambling circuits. If the third inversion selecting circuit is used, security is further increased since a potential eavesdropper must determine whether the scrambled signal is inverted or not inverted, as well as determine which of the two band signals is inverted or not.

The descrambling circuit according to the present invention, includes a first low pass filter that separates a frequency band lower than a first cutoff frequency from a scrambled signal. A first inversion selecting circuit inverts or non-inverts the output signal of the first low pass filter in response to a first predetermined selection signal. A high pass filter separates a frequency band higher than the first cutoff frequency from the scrambled signal. A second inversion selecting circuit inverts or non-inverts the output signal of the high pass filter in response to a second predetermined selection signal. An adder mixes the output signals of the first and second inversion selecting circuit. The mixed signal serves as an original audio signal. A low pass filtering circuit passes through the mixed signal frequency band lower than a predetermined frequency.

The descrambling circuit further includes a third inversion selecting circuit commonly connected to the input terminal of the first low pass filter and the high pass filter. The third inversion circuit inverts or non-inverts a scrambled signal in response to a third predetermined selection signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Figure 1:
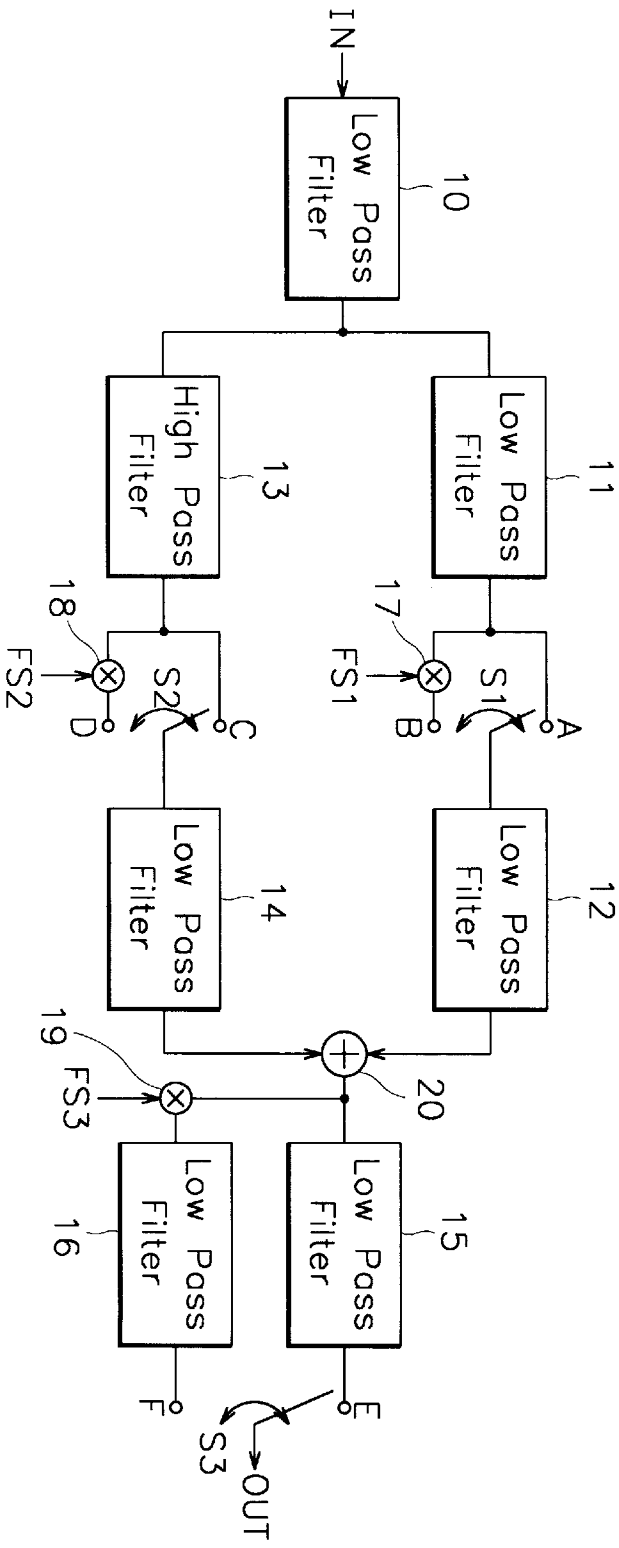
FIG. 1 is a block diagram showing an embodiment of a scrambling circuit according to this invention.

An embodiment of the present invention will be described in detail below with reference to the accompanying drawings.

Referring to FIG. 1 and FIGS. 2A–2C, a scrambling circuit includes a first low pass filter 10 that receives an audio input signal IN. The output of the first low pass filter 10 is commonly coupled to an input of a second low pass filter 11 and an input of a high pass filter 13. The output of the second low pass filter 11 is commonly coupled to a terminal A and an input of a first modulator 17 that has a first split frequency FS1. The output of the first modulator 17 is coupled to a terminal B. The two terminals A and B form two inputs of a first switch S1, and the output of the first switch S1 is coupled to an input of a third low pass filter 12.

The output of the high pass filter 13 is commonly coupled to a terminal C and an input of a second modulator 18 that has a second split frequency FS2. The output of the second modulator 18 is coupled to a terminal D. The two terminals C and D form two inputs of a second switch S2. The output of the second switch S2 is coupled to an input of a fourth low pass filter 14. The two outputs of the third and fourth low pass filters 12 and 14 are coupled to two inputs of an adder 20. The output of the adder 20 is commonly coupled to an input of a fifth low pass filter 15 and an input of a third modulator 19 having a third split frequency FS3. The output of the third modulator 19 is coupled to an input of a sixth low pass filter 16. The output of the fifth low pass filter 15 is coupled to a terminal E, and the output of the sixth low pass filter 16 is coupled to a terminal F. The two terminals E and F form two inputs of a third switch S3. The output of the third switch S3 serves as a scrambled signal OUT.

It is assumed that the audio input signal IN is restricted to a general audio band ranging from 300 to 3400 Hz. In addition, under this condition for the audio input signal IN, one of 767, 837, 897, 1018, 1117, 1297, 1507, 1853 and 2461 Hz is typically used as a basic split frequency FS. Values for the basic split frequency Fs do not limit the scope or technical range of this invention. The three switches S1, S2 and S3 are electronically controlled switches. A corresponding selection signal is applied to each of the switches S1, S2 and S3.

When appropriate power is supplied to the circuit, the audio input signal having a restricted frequency band as previously described is applied to the first low pass filter 10. The first low pass filter 10 passes through the audio input signal IN having a frequency band lower than a given cutoff frequency. Low pass filter 10 removes high frequency noise that may be included in the audio input signal IN. Since the frequency band of the audio input signal IN is restricted to frequencies ranging from 300 to 3400 Hz, it is desirable for the cutoff frequency of the first low pass filter 10 to be set at 3400 Hz. The output of the first low pass filter 10 is applied to both the second low pass filter 11 and high pass filter 13.

The cutoff frequencies of the second low pass filter 11 and high pass filter 13 are the same. It is assumed that the value of the cutoff frequencies is the same as the basic split frequency FS.

The second low pass filter 11 passes through the input signal having a frequency band lower than the given cutoff frequency. The high pass filter 13 passes through the input signal having a frequency band higher than the given cutoff frequency. The low pass filter 11 outputs a low frequency band signal separated from the input signal and the high pass filter 13 outputs a high frequency band signal separated from the input signal.

The output of the second low pass filter 11 is applied to the first modulator 17. The first modulator 17 inverts the input signal, and transforms the frequency components of the inverted signal so that the inverted signal appears to be symmetric in the right and left sides of the first split frequency FS1. It is assumed that the value of the first split frequency FS1 is a basic frequency FS+300 Hz.

The output of the high pass filter 13 is applied to the second modulator 18. In the similar manner as the first modulator 17, the second modulator 18 inverts the input signal. The frequency components of the inverted signal appear symmetric in the right and left sides of the second split frequency FS2. It is assumed that the value of the second split frequency FS2 is a basic frequency FS+3400 Hz.

The first switch S1 selects either terminal A or B in response to a predetermined selection signal. If the first switch S1 selects terminal A, the non-inverted low frequency band signal is applied to the third low pass filter 12. If the first switch S1 selects terminal B, the inverted low frequency band signal is applied to the third low pass filter 12. The third low pass filter 12 passes through the input signal having a frequency band lower than a given cutoff frequency, and this cutoff frequency is the same as the first split frequency FS1.

When the first switch S1 selects the terminal B from the output of the first modulator 17, the signal having a frequency band lower than the first split frequency FS1 passes through the third low pass filter 12. The cutoff frequency of the third low pass filter 12 is the same as the first split frequency FS1.

The second switch S2 selects terminal C or terminal D in response to a predetermined selection signal. If the second switch S2 selects terminal C, the non-inverted high frequency band signal is applied to the fourth low pass filter 14. If the second switch S2 selects terminal D, the inverted high frequency band signal is applied to the fourth low pass filter 14.

The fourth low pass filter 14 passes through the input signal having a frequency band lower than a given cutoff frequency which is the same as the second split frequency FS2. When the second switch S2 selects the terminal D from the output of the second modulator 18, the signal having a frequency band lower than the second split frequency FS2 passes by the fourth low pass filter 14. The cutoff frequency of the third low pass filter 14 is the same as the second split frequency FS2.

As described above, the low and high frequency band signals are respectively obtained from the output terminals of the third and fourth low pass filters 12 and 14. The two band signals are mixed by the adder 20. The mixed signal output from the adder 20 is applied to the fifth low pass filter 15 and the third modulator 19. The cutoff frequencies of the fifth and sixth low pass filters 15 and 16 are both 3400 Hz. The third split frequency FS3 is the same as the second split frequency FS2.

The third modulator 19 inverts the output signal of the adder 20. The frequency components of the inverted signal appear symmetric in the right and left sides of the third split frequency FS3. The output of the third modulator 19 is applied to the sixth low pass filter 16, and the sixth low pass filter 16 passes through the input signal having a frequency band lower than a given cutoff frequency. The fifth low pass filter 15 also passes through the input signal having a frequency band lower than a given cutoff frequency.

Consequently, a non-inversion of the output signal of the adder 20 is obtained in the output terminal E of the fifth low pass filter 15, and an inversion of the output signal of the adder 20 is obtained in the output terminal F of the sixth low pass filter 16. The third switch S3 selects either the terminal E or F in response to a predetermined selection signal. The terminal signal selected by the third switch S3 serves as a scrambled signal OUT, and the scrambled signal OUT is transmitted to a receiver by way of a transmission channel such as an RF link.

FIGS. 2A–2D are examples showing the characteristics in response to the switching states of the switches S1, S2 and S3. The horizontal axis is frequency and the vertical axis is power density. The region denoted by '1' is low frequency band, and the region denoted by '2' is high frequency band.

Figure 2A:
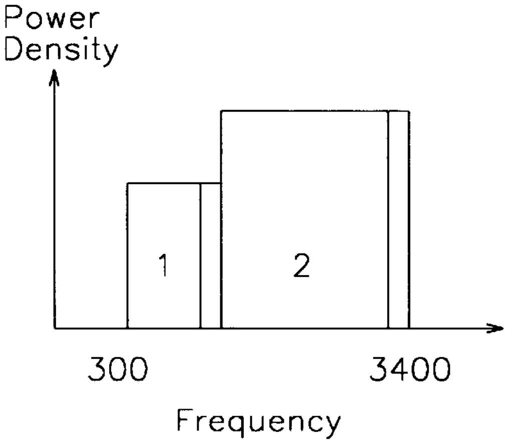
FIGS. 2A–2D are frequency characteristic diagrams for illustrating the operation of the circuit in FIG. 1.

FIG. 2A shows the case that the switches S1, S2 and S3 select terminals A, C and E, respectively. In this case, the low and high frequency bands are all non-inverted, and the band of the overall signal is also non-inverted.

Figure 2B:
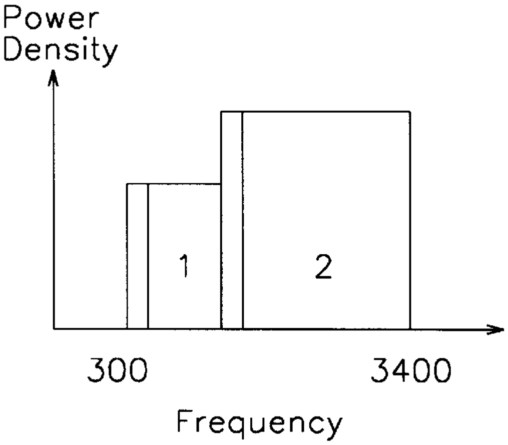

FIG. 2B shows the case that the switches S1, S2 and S3 select terminals B, D and E respectively. In this case, the low and high frequency bands are all inverted, but the band of the overall signal is non-inverted.

Figure 2C:
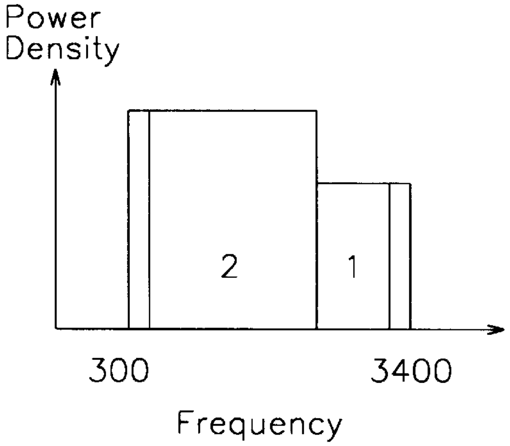

FIG. 2C shows the case that the switches S1, S2 and S3 select terminals A, D and F respectively. In this case, the low frequency band is non-inverted, and the high frequency band and the band of the overall signal is inverted.

Figure 2D:
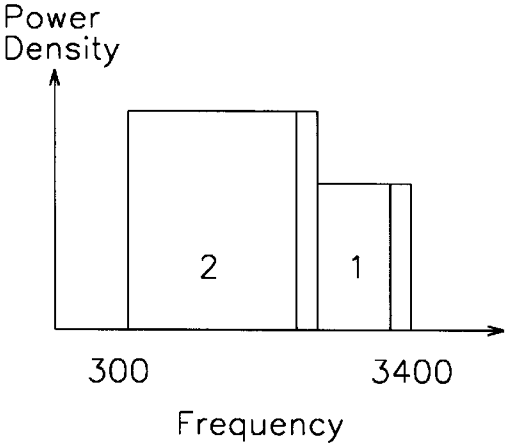

FIG. 2D shows the case that the switches S1, S2 and S3 select terminals A, C and F respectively. In this case, the low and high frequency bands are all non-inverted, and the band of the overall signal is inverted.

Since the number of the switches is 3 and each of the switches has two states, 8 cases of a scrambled signal are possible. Only 4 cases of the possible cases are illustrated in FIGS. 2A–2D.

The selection signals for controlling the switches S1, S2 and S3 are transmitted to a receiver along with the scrambled signal. The selection signals are implemented for a descrambling procedure that restores the original audio signal from a scrambled signal in the descrambling circuit of the receiver.

Figure 3:
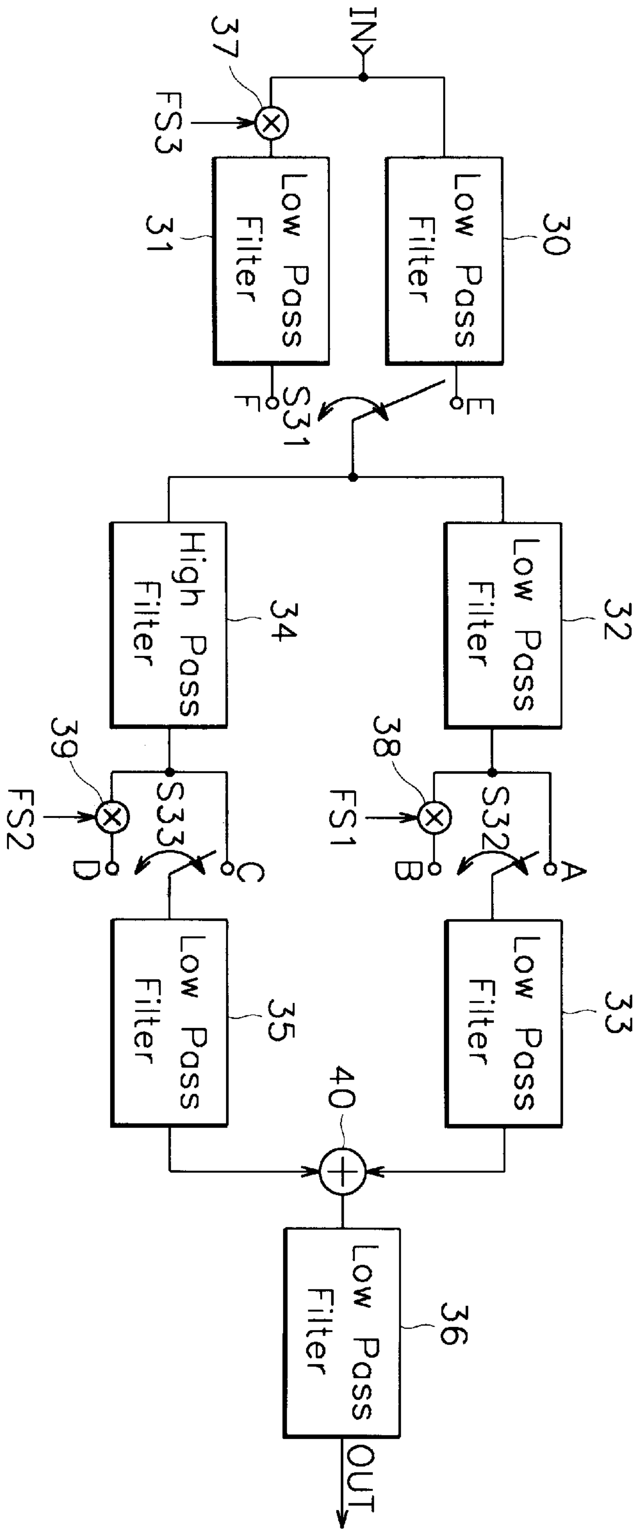
FIG. 3 is a block diagram showing an embodiment of a descrambling circuit according to this invention.
Figure 4:
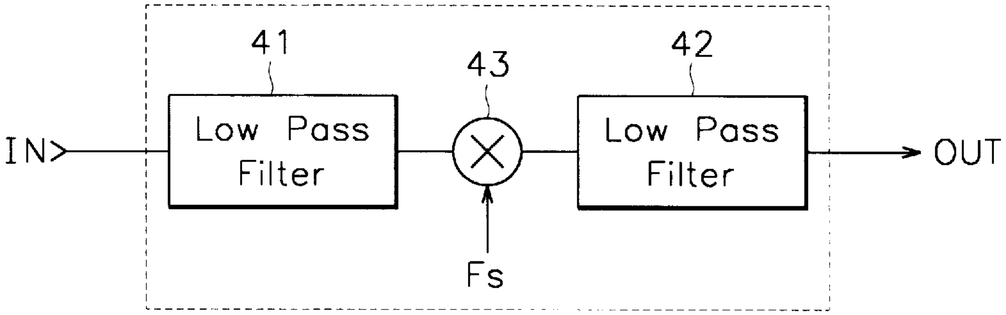
FIG.4(Prior Art)
FIG. 4 is a block diagram showing a scrambling circuit according to a prior frequency inversion method.
Figure 5A:
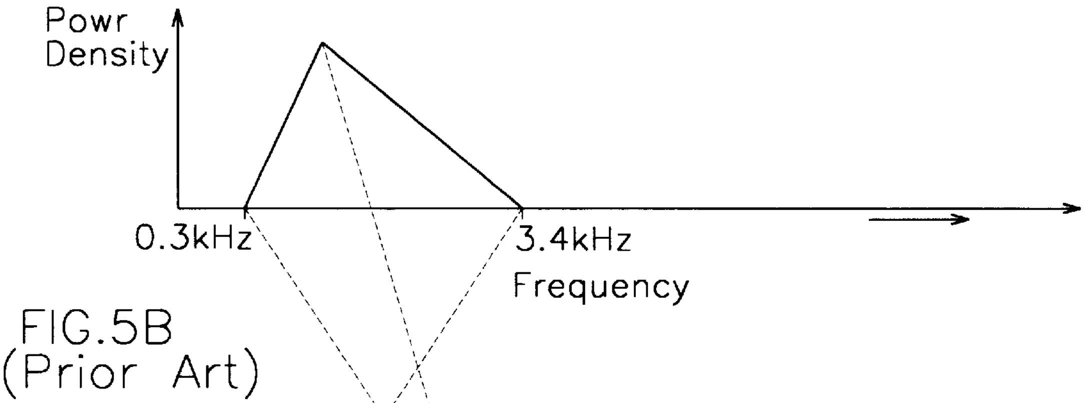
FIG.5A (Prior Art)
FIGS. 5A–5C are frequency characteristic diagrams for illustrating a scrambling procedure.
Figure 5B:
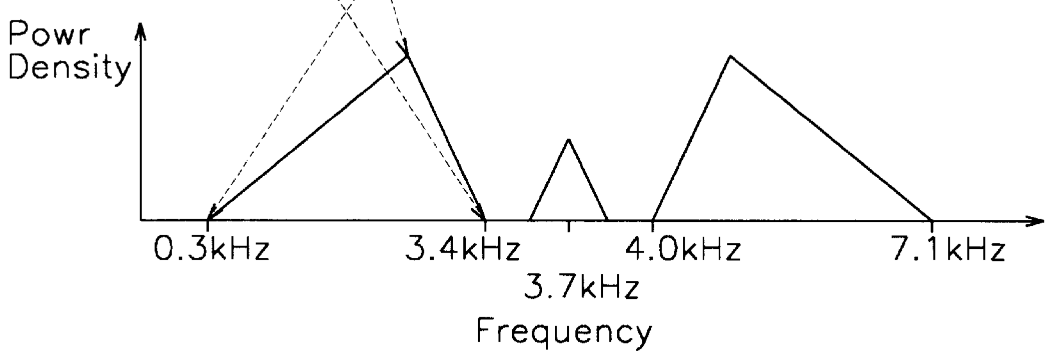
FIG.5B (Prior Art)
Figure 5C:
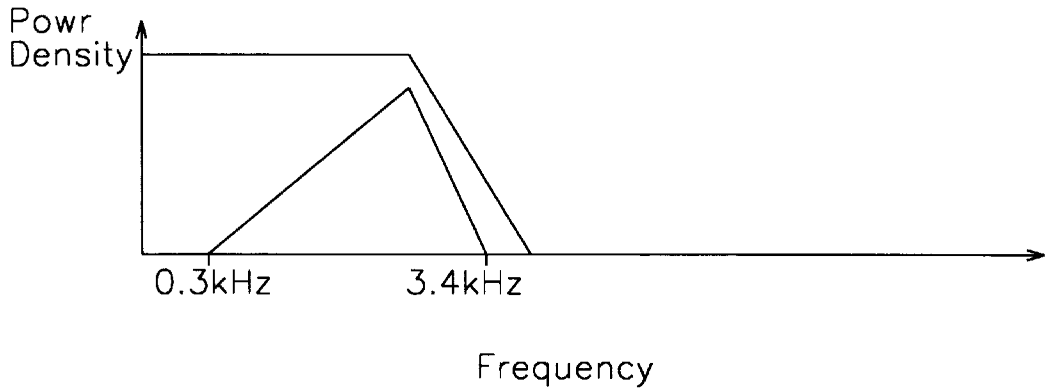
FIG.5C (Prior Art)
Figure 6A:
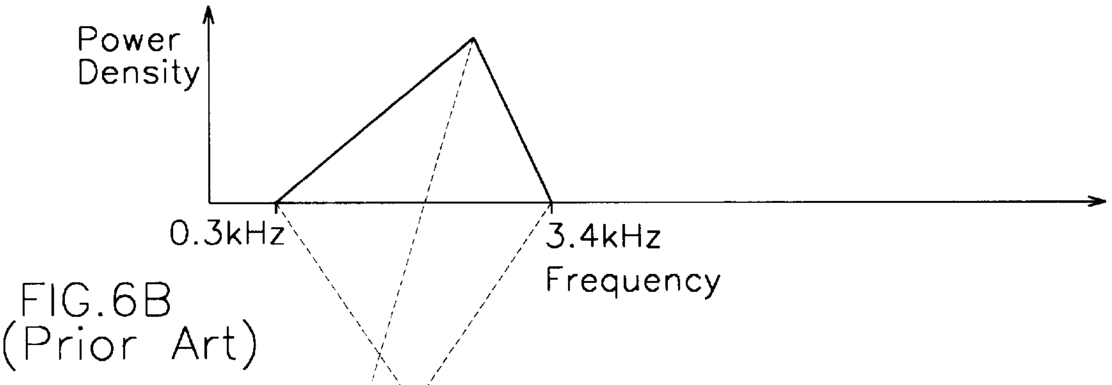
FIG.6A (Prior Art)
FIGS. 6A–6C are frequency characteristic diagrams for illustrating a descrambling procedure.
Figure 6B:
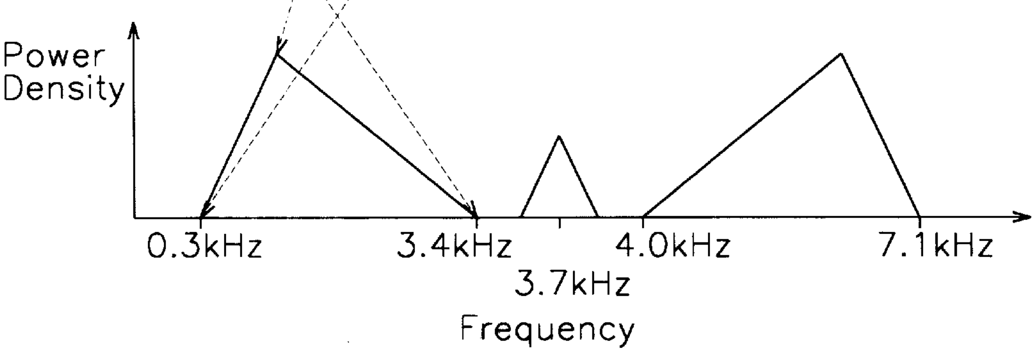
FIG.6B (Prior Art)
Figure 6C:
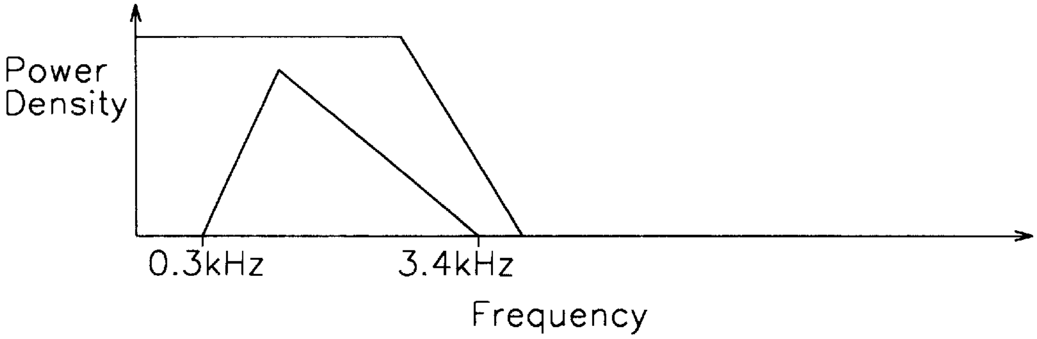
FIG.6C (Prior Art)
Figures 7A, 7B:
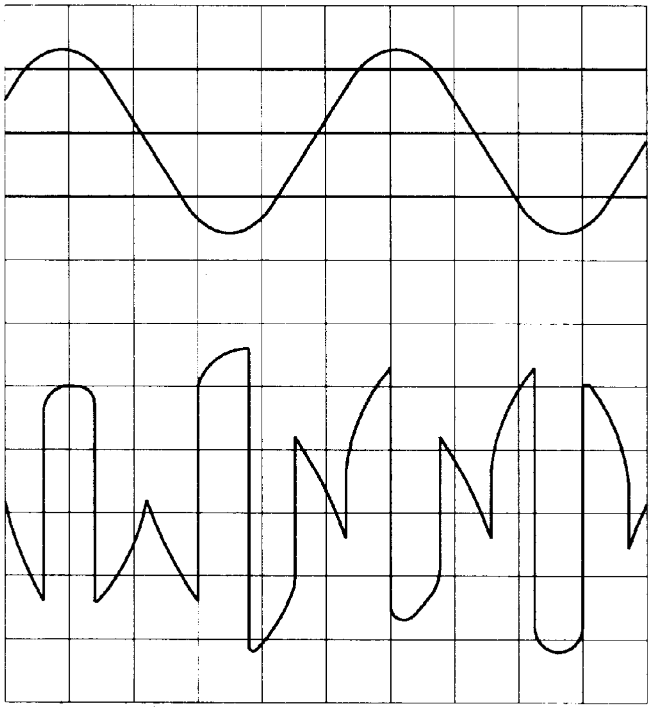
FIG.7A (Prior Art)
FIG.7B (Prior Art)
FIGS. 7A and 7B are waveforms showing the input and output signals of the modulator in FIG. 4, respectively.
Figure 8A:
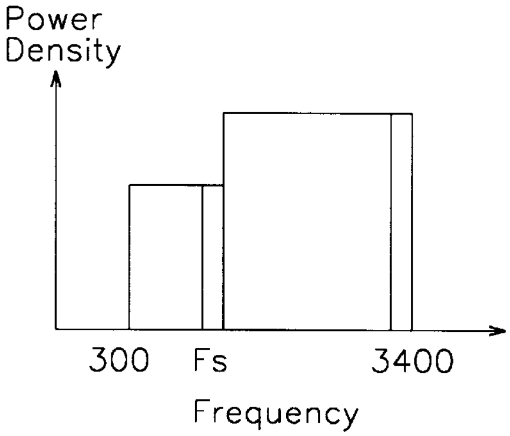
FIG.8A (Prior Art)
FIGS. 8A and 8B are frequency characteristic diagrams for illustrating a scrambling procedure according to a prior band-shift inversion method.
Figure 8B:
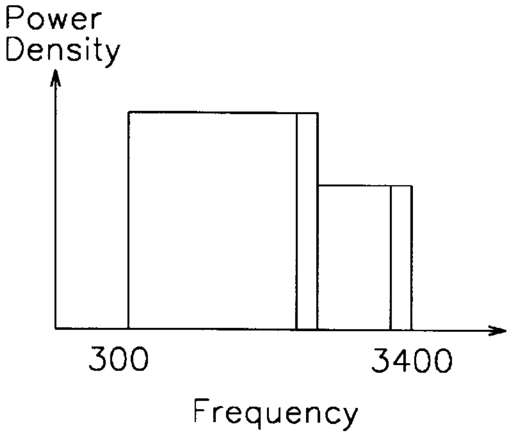
FIG.8B (Prior Art)

Referring to FIG. 3, a descrambling circuit according to this invention will now be described.

As shown in FIG. 3, the descrambling circuit comprises a first low pass filter 30 and a first modulator 37 that commonly receives an input signal IN. The first modulator 37 has a split frequency FS3. The input signal IN is a scrambled signal that is transmitted by way of a communication channel. The output of the first modulator 37 is coupled to an input of a second low pass filter 31. The output of the first low pass filter 30 is coupled to a terminal E, and the output of the second low pass filter 31 is coupled to a terminal F. The two terminals E and F form two inputs of a first switch S1, and the output of the first switch S31 is commonly coupled to an input of a third low pass filter 32 and an input of a high pass filter 34. The output of the third low pass filter 32 is commonly coupled to a terminal A and an input of a second modulator 38 that has a split frequency FS1. The output of the second modulator 38 is coupled to a terminal B. The two terminals A and B form two inputs of a second switch S32, and the output of the second switch S32 is coupled to an input of a fourth low pass filter 33.

The output of the high pass filter 34 is coupled to a terminal C and an input of a third modulator 39 that has a split frequency FS2. The output of the third modulator 39 is coupled to a terminal D. The two terminals C and D form the two inputs of a third switch S33, and the output of the third switch S33 is coupled to an input of a fifth low pass filter 35.

The two outputs of the fourth and fifth low pass filters 33 and 35 are coupled to two inputs of an adder 40. The output of the adder 40 is coupled to an input of a sixth low pass filter 36, and the output of the sixth low pass filter 36 serves as a descrambled signal OUT.

In the configuration of the descrambling circuit, the switches S31, S32 and S33 respectively correspond to the switches S3, S1 and S2 in FIG. 1, and the transmitted selection signals of the switches S1, S2 and S3 are respectively applied to the switches S32, S33 and S31.

The input signal IN is received from a transmission channel such as a RF link. If appropriate power is supplied to the descrambling circuit, the input signal IN is commonly applied to the first low pass filter 30 and the modulator 37. The first modulator 37 functionally corresponds to the third modulator 19 in FIG. 1, the split frequency FS3 is the same as that of the third modulator 19 in FIG. 1.

Accordingly, in the similar manner of the scrambled circuit as previously described, the first modulator 37 inverts the input signal IN and transforms the frequency components of the inverted signal. Then, the output of the first modulator 37 is applied to the second low pass filter 31.

The first and second low pass filters 30 and 31 respectively correspond to the fifth and sixth low pass filters 15 and 16 in FIG. 1. The cutoff frequencies for the filters 30 and 31 are the same as those of the corresponding filters 15 and 16, respectively.

Each of the outputs of low pass filters 30 and 31 are respectively applied to the two terminals E and F. The switch S31 selects one of the terminals E or F in response to the transmitted selection signal. The terminal selected by the switch 31 is commonly applied to the third low pass filter 32 and high pass filter 34.

From a functional point, the third low pass filter 32 and high pass filter 34 correspond to the second low pass filter 11 and high pass filter 13, respectively. The cutoff frequencies of the filters 32 and 34 are the same as those of the corresponding filters.

A low frequency band signal is obtained in the output terminal of the third low pass filter 32, and a high frequency band signal is obtained in the output terminal of the high pass filter 34.

The second and third modulators 38 and 39 correspond to the first and second modulators 17 and 18, respectively, in FIG. 1. The split frequencies FS1 and FS2 are same as those of the corresponding modulators 17 and 18, respectively.

The second modulator 38 inverts the output signal of the third low pass filter 32. The frequency components of the inverted signal are transformed in the same manner as previously described for modulator 17. The third modulator 39 inverts the output signal of the high pass filter 34, and transforms the frequency components of the inverted signal in the same manner as previously described for modulator 18.

The switch S32 selects either terminal A or B in response to the transmitted selection signal. The switch S33 selects either terminal C or D in response to the transmitted selection signal. The switches S32 and S33 correspond to the switches S1 and S2 in FIG. 1, respectively. Selection signals for the switches S32 and S33 are the same as those for the switches S1 and S2, respectively.

For example, if the switch S1 in FIG. 1 selects the terminal B, the switch S32 in FIG. 3 also selects terminal B.

The low frequency band of the original audio signal is inverted in the scrambling circuit, and the inverted signal is again inverted in the descrambling circuit. Thus, the signal selected by the switch S32 becomes the low frequency band of the original audio signal.

The signals selected by the switches S32 and S33 are applied to the fourth and fifth low pass filters 33 and 35, respectively. Low and high frequency band signals are then obtained by the filtering operation of the filters 33 and 35. The fourth and fifth low pass filters 33 and 35 correspond to the third and fourth low pass filters 12 and 14, respectively. The cutoff frequencies of the filters 33 and 35 are the same as those of the corresponding filters 12 and 14.

The signals from the filters 33 and 35 are mixed by the adder 40. The mixed signal is applied to the sixth low pass filter 36. The sixth low pass filter 36 has a cutoff frequency of 3400 Hz and passes through the input signal having a frequency band lower than the given cutoff frequency. The output signal of the sixth low pass filter 36 serves as a descrambled signal OUT. The descrambled signal is the same as the audio input signal IN in FIG. 1.

As described in the above embodiment, the invention provides a scrambling and a descrambling circuit having a higher security level than the prior art circuits. The higher security level is accomplished by separating an audio signal into low and high frequency bands. The separated bands are selectively inverted or non-inverted during scrambling and descrambling with the same selection conditions.

The overall signal is inverted or non-inverted during scrambling and descrambling to increase the telephone security level.

While specific embodiment of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A security circuit for a cordless telephone, which comprises:

a low pass filtering circuit including an output passing through an audio input signal having a frequency band lower than a predetermined frequency;

a first low pass filter separating a frequency band signal lower than a first cutoff frequency from the output of the low pass filtering circuit;

a first inversion selecting circuit coupled to the first low pass filter and switching between an inverting node and a non-inverting node in response to a first predetermined selection signal, the inverting node outputting only a separated inverted frequency band signal from the low pass filter and the non-inverting node outputting only a separated non-inverted frequency band signal from the low pass filter;

a high pass filter in parallel and operating independently from the first low pass filter separating a frequency band signal higher than the first cutoff frequency from the output of the low pass filtering circuit;

a second inversion selecting circuit in parallel and operating independently from the first inversion selecting circuit coupled to the high pass filter and switching between an inverting node and a non-inverting node in response to a second predetermined selection signal, the inverting node inverting and outputting only the separated frequency band signal from the high pass filter and the non-inverting node outputting only the non-inverted separated frequency band signal from the high pass filter;

an adder mixing the signal from the first inversion selecting circuit and the signal from the second inversion selecting circuit; and a third inversion selecting circuit connected to the adders the third inversion selecting circuit receiving the signals mixed by the adder and switching between an inverting node and a non-inverting node in response to a third predetermined selection signal, the inverting node inverting the mixed signals from the adder and the non-inverting node not inverting the mixed signals from the adder, an output from the third inversion selecting circuit serving as a scrambled audio signal.

2. The security circuit of claim 1 wherein the first inversion selecting circuit includes:

a first modulator for inverting the separated frequency band signal from the first low pass filter and transforming frequency components of the inverted signal so that the inverted signal appears to be symmetric in a right and a left side of a first split frequency;

a first switching circuit for selecting one of the inverted frequency band signal from the first modulator and the frequency band signal from the first low pass filter in response to the first predetermined selection signal; and a second low pass filter having a second cutoff frequency substantially equal to the first split frequency, and passing through the selected signal having a frequency band lower than the second cutoff frequency.

3. The security circuit of claim 2 wherein the second inversion selecting circuit includes:

a second modulator for inverting the separated frequency band signal from the high pass filter and transforming frequency components of the inverted signal so that the inverted signal appears to be symmetric in a right side and a left side of a second split frequency;

a second switching circuit for selecting one of the inverted frequency band signal from the second modulator and the high frequency band signal from the high pass filter in response to the second predetermined selection signal; and a third low pass filter having a third cutoff frequency equal to the second split frequency, and passing through the selected signal having a lower frequency band than the third cutoff frequency.

4. The security circuit of claim 1 wherein the predetermined selection signals are transmitted over a communication channel to a receiver having a descrambling circuit.

5. The security circuit of claim 1 wherein said first inversion selecting circuit includes:

a first modulator for inverting the separated frequency band signal from the first low pass filter and transforming frequency components of the inverted signal so that the inverted signal appears to be symmetric in a right and a left side of a first split frequency;

a first switching circuit for selecting one of the inverted frequency band signal from the first modulator and the frequency band signal from the first low pass filter in response to the first predetermined selection signal; and a second low pass filter having a second cutoff frequency same as the first split frequency, and passing through the selected signal having a frequency band lower than the second cutoff frequency.

6. The security circuit of claim 5 wherein the second inversion selecting circuit includes:

a second modulator for inverting the separated frequency band signal from the high pass filter and transforming frequency components of the inverted signal so that the inverted signal appears to be symmetric in a right side and a left side of a second split frequency;

a second switching circuit for selecting one of the inverted frequency band signal from the second modulator and the high frequency band signal from the high pass filter in response to the second predetermined selection signal; and a third low pass filter having a third cutoff frequency equal to the second split frequency, and passing through the selected signal having a lower frequency band than the third cutoff frequency.

7. The security circuit of claim 6 wherein the third inversion selecting circuit includes:

a third modulator for inverting the mixed signal from the adder and transforming the frequency components of the inverted signal so that the inverted signal appears to be symmetric in a right and left side of a third split frequency;

a fourth low pass filter for passing through the added signal having a frequency band lower than a fourth cutoff frequency;

a fifth low pass filter for passing through the inverted signal from the third modulator, the inverted signal having a frequency band lower than a fifth cutoff frequency, the fifth cutoff frequency equal to the fourth cutoff frequency; and a third switching circuit for selecting one of the signals of the fourth and fifth low pass filters in response to the third predetermined selection signal.

8. The security circuit of claim 1 wherein the predetermined selection signals are transmitted over a communication channel to a receiver having a descrambling circuit.

9. A descrambling circuit for a cordless telephone comprising:

an initial inversion selecting circuit commonly connected to an input terminal of a first low pass filter and the input terminal of a high pass filter, the first low pass filter separating a frequency band in a scrambled audio signal lower than a first cutoff frequency and the high pass filter separating a frequency band from the scrambled audio signal higher than the first cutoff frequency, the initial inversion selecting circuit switching between an inverting position and a non-inverting position in response to an initial predetermined selection signal, inverting the scrambled audio signal when in the inverting position and not inverting the scrambled audio signal when in the non-inverting position;

a first inversion selecting circuit coupled to the low pass filter and switching between a first modulating node and a first non-modulating node in response to a first predetermined selection signal, the first modulating node inverting the output signal from the low pass filter and the first non-modulating node not inverting the output signal from the low pass filter;

a second inversion selecting circuit coupled to the high pass filter and switching between a second modulating node and a second non-modulating node in response to a second predetermined selection signal, the second modulating node inverting the output signal from the high pass filter and the second non-modulating node not inverting the output signal from the high pass filter;

an adder coupled directly to the first inversion selecting circuit and coupled directly to the second inversion selecting circuit and mixing a first output signal from the first inversion selecting circuit with a second output signal from the second inversion selecting circuit without requiring frequency shifting of the first output signal or the second output signal;

a second low pass filter passing through the mixed signal having a frequency band lower than a predetermined frequency, the output of the second low pass filter serving as an unscrambled audio signal.

10. The describing circuit of claim 9 wherein the predetermined selection signals are received over a communication channel from a transmitter having a scrambling circuit.

11. A circuit for securing an audio input signal in a cordless telephone, comprising:

a filtering circuit separating the audio input signal from the cordless telephone into a first and second frequency band;

a first inversion selecting circuit receiving the first frequency band and switching between an inverting position and a non-inverting position in response to a first selection signal, the first inversion selecting circuit in the inverting position inverting the first frequency band and in the non-inverting position not inverting the first frequency band;

a second inversion selecting circuit receiving the second frequency band and switching between an inverting position and a non-inverting position in response to a second selection signal, the second inversion circuit in the inverting position inverting the second frequency band and in the non-inverting position not inverting the second frequency band;

a mixer mixing a first frequency band output from the first inversion selection circuit with a second frequency band output from the second inversion selecting circuit into a mixed signal, the output from the first inversion selecting circuit and the output from the second inversion selecting circuit not being frequency shifted before being mixed by the mixer; and a third inversion selecting circuit for selectively inverting or non-inverting the mixed audio signal according to a third selection signal, the inverted/non-inverted mixed audio signal serving as a scrambled audio signal transmitted between a cordless telephone base station and a handset of the cordless telephone.

12. A method for securing an audio input signal in a cordless telephone, comprising:

separating the audio input signal from the cordless telephone into a first and second frequency band using a filtering circuit;

selecting between a first inverting state and a first non-inverting state using a first selecting circuit responding to a first predetermined selection signal;

processing the first frequency band by inverting the first frequency band when in the first inverting state and not inverting the first frequency band when in the first non-inverting state;

selecting between a second inverting state and a second non-inverting state using a second selecting circuit responding to a second predetermined selection signal;

processing the second frequency band by inverting the second frequency band when in the second inverting state and not inverting the second frequency band when in the second non-inverting state;

mixing the processed first frequency band and the processed second frequency band into a mixed signal without frequency shifting the processed first frequency band and the processed second frequency band;

selecting between a third inverting state of said mixed signal and a third non-inverting state of said mixed signal using a third selecting circuit responding to a third predetermined selection signal;

processing the mixed signal by inverting the mixed signal when in the third inverting state and not inverting the mixed signal when in the third non-inverting state thereby providing a scrambled audio signal; and transmitting the scrambled audio signal between a base station and a handset of the cordless telephone.

13. A method according to claim 12 including the following steps:

switching between an initial inverting state and an initial non-inverting state according to an initial selection signal transmitted between the base station and the handset;

inverting the scrambled audio signal when in the initial inverting state and not inverting the scrambled audio signal when in the initial non-inverting state;

separating the inverted/non-inverted scrambled audio signal into a first and second frequency band;

switching between a first inverting state and a first non-inverting state according to a first selection signal transmitted between the base station and the handset;

inverting the first frequency band when in the first inverting state and not inverting the first frequency band when in the first non-inverting state;

switching between a second inverting state and a second non-inverting state according to a second selection signal transmitted between the base station and the handset;

inverting the second frequency band when in the second inverting state and not inverting the second frequency band when in the second non-inverting state; and mixing the inverted/non-inverted first and second frequency band, the mixed first and second frequency band serving as a descrambled audio signal.

* * * * *

UNITED STATES PATENT AND TRADEMARK OFFICE

CERTIFICATE OF CORRECTION

PATENT NO. : 5,991,416
DATED : November 23, 1999
INVENTOR(S) : Bae

It is certified that error appears in the above-identified patent and that said Letters Patent is hereby corrected as shown below:

Column 10,
Line 8, "adders" should read -- adder --;

Column 12,
Line 14, "describing" should read -- descrambling --.

Signed and Sealed this

Eleventh Day of February, 2003

JAMES E. ROGAN
*Director of the United States Patent and Trademark Office*